United States Patent [19]

Reid et al.

[11] Patent Number: 4,571,651
[45] Date of Patent: Feb. 18, 1986

[54] METHOD OF MANUFACTURING A MAGNETIC HEAD ASSEMBLY AND PRODUCT

[75] Inventors: James Reid, Santa Ynez; Gary E. Roberts, Santa Barbara, both of Calif.

[73] Assignee: Applied Magnetics Corporation, Goleta, Calif.

[21] Appl. No.: 542,051

[22] Filed: Oct. 14, 1983

[51] Int. Cl.<sup>4</sup> .......................... G11B 5/127; G11B 5/33
[52] U.S. Cl. ...................................... 360/113; 29/603; 360/121; 360/127
[58] Field of Search ................... 29/603; 360/103, 129, 360/121, 125–127, 113

[56] References Cited

U.S. PATENT DOCUMENTS

4,044,392  8/1977  Brock et al. ...................... 29/603 X
4,370,801  2/1983  Roscamp et al. ..................... 29/603

Primary Examiner—Carl E. Hall
Attorney, Agent, or Firm—Daniel J. Meaney, Jr.

[57] ABSTRACT

A method of manufacturing a transducing sub-assembly for a magnetic head assembly comprising the steps of affixing a transducer onto a substrate wherein the transducing element is located on one side thereof and leads extending from the transducing element are located on a different side thereof and wherein the substrate is formed of a material which is highly resistant to being abraded by a recording medium being transported thereacross and wherein the transducer is affixed to the support surface with the transducing element located adjacent the medium contacting surface and with the leads extending along the supporting surface away from the medium contacting surface; bonding a spacer to the substrate and transducer wherein the substrate and spacer are formed of a material which is highly resistant to being abraded by a recording medium and has a medium contacting surface of a preselected width and spaced sidewalls extending substantially perpendicular therefrom a distance equal to the length of the transducing element; bonding an electrical circuit means to the substrate and transducer wherein the electrical circuit means terminates in an edge having a width which does not exceed the preselected width and wherein the exposed conductors are positioned in electrical contact with the leads of the transducer and in opposed, spaced alignment from the spacer and applying a clamping force to the transducing subassembly during the bonding steps is shown. A product formed by using the process is also shown.

23 Claims, 12 Drawing Figures

METHOD OF MANUFACTURING A MAGNETIC HEAD ASSEMBLY AND PRODUCT

BACKGROUND OF THE INVENTION

1. Field of the Invention

This invention relates to a method of manufacturing a transducing head assembly adpated for use with a recording medium and more particularly to a method of manufacturing a transducing head assembly adpated for a single or multi-track read-while-write magentic tape head assembly adapted for use with a recording medium which is transported thereacross and wherein the transducing head assembly is formed of two thin film transducing head sub-assemblies joined together with a magnetic feed-through shield located therebetween.

2. Description of the Prior Art

The use of thin film transducers as part of a transducing head assembly and the method of fabricating the same are well known in the art. One method of fabricating a thin film magnetic head assembly having glass bonded thin film transducers is disclosed in U.S. Pat. No. 4,143,458 entitled Method Of Making a Thin Film Magnetic Head Assembly by George W. Gibson assigned to the assignee of the present application.

Typically magnetic head assemblies formed of thin film magnetic transducers are utilized in apparatus for recording and reproducing information onto and from a magnetic medium. The magnetic recording and reproducing apparatus may be a magnetic disc or magnetic tape. In magnetic disc recording and reproducing apparatus, the magnetic disc is rotated relative to the magnetic head assembly at a constant speed. Typically, the reading and recording of information onto and from the rotating magnetic medium is accomplished by using inductive thin film magnetic transducers as the transducers forming the magnetic head assembly. In certain of the magnetic disc apparatus, the magnetic head assembly includes a slider which enables the magnetic head assembly to fly on a thin film air bearing. The thin film air bearing provides non-contact magnetic transducing acting between the magnetic head assembly, which may contain one or more magnetic transducing heads, and the rotating magnetic medium.

In magnetic tape recording and reproducing apparatus, the magnetic head assembly is oriented relative to the magnetic tape such that the magnetic tape is in contact with and is transported across the magnetic tape head assembly. During operation, the magnetic tape is transported across and contacts the magnetic head assembly resulting in the magnetic tape abrading the medium contacting surface of the magnetic head assembly. This has the attended effect of wearing both the magnetic tape and magnetic head assembly, which directly determine both tape life and head life.

It is likewise known in the art to utilized a inductive magnetic transducer as the "write" transducer and a magnetoresistive transducer as the "read" transducer in a magnetic head assembly, such as, for example, in a magnetic tape head assembly. In a magnetic tape head assembly, the magnetoresistive transducer produces electrical signals from the information recorded on a magnetic medium and magnitudes of the so produced electrical signals are independent of any variations in the speed of the magnetic tape being transported thereacross. However, a magnetoresistive transducer is sensitive to magnetic fields produced by an inductive magnetic transducer. As such, the magnetoresistive transducer subassembly is typically shielded from the inductive magnetic assembly to eliminate feed-through therebetween.

One known process for fabricating a read-while-write magnetic tape head assembly using an inductive write transducer and a magnetoresistive read transducer is disclosed in U.S. Pat. No. 4,044,392. In the method disclosed in U.S. Pat. No. 4,044,392, the active read and write elements are deposited on ferrite half-yokes attached to titanium or baria titania ceramic end pieces. A center section, formed of a sandwich of silver-copper shielding material between two ferrite sheets having glass filled slots, is placed between the read and write transducers with the write windings between pairs of the glass filled slots. The magnetoresistive elements are positioned in contact with the opposite surface of the center or feed-through shield. The glass filled slots on each side of the write elements define the track edge. The titanium or the baria titania ceramic end pieces, having the inductive elements and magnetoresistive elements formed thereon, are assembled with the center section therebetween and joined together in a manner such that a vise-like action holds the magnetic tape head assembly together.

It is also known in the art to mount a magnetic disc head assembly onto magnetic head sliders to form a magnetic head slider assembly. Typically, magnetic head slider assemblies are utilized to fly the magnetic head assembly supported thereby on an air bearing relative to a rotating magnetic disc. With the advent of thin film magnetic transducers, the physical size of the transducing element is extremely small. This has necessitated a reduction in size of the slider elements which, in turn, has caused an increase in the difficulty of fabricating the smaller slider elements. As a result thereof, new compositions of material have been developed which are resistant to breakage, have improved machining properties and good wear characteristics. One such magnetic head slider assembly is disclosed in U.S. Pat. No. 4,251,841 wherein the slider element is formed of a mixture of Aluminum Oxide ($Al_2O_3$) and Titanium Carbide (TiC) in certain ratios and of compositions having certain grain sizes, all as disclosed in the U.S. Pat. No. 4,251,841.

SUMMARY OF THE INVENTION

This invention relates to a new, novel and unique method for manufacturing a single or multi-track magnetic head assembly which is formed of two thin film transducing sub-assemblies, one of which may include an inductive thin film transducer and the other of which may include a magnetoresistive thin film transducer. Specifically, this invention relates to a method of manufacturing a read-while-write magnetic head assembly adapted for use with a recording medium and including one or more transducing sub-assemblies. A transducing sub-assembly is formed by the steps of affixing a transducer onto a substrate wherein the transducer includes a transducing element located on one side thereof and leads located on a different side therof and wherein the substrate is formed of a material which is highly resistant to being abraded by a recording medium being transported thereacross and the substrate has a medium contacting surface and a supporting surface which is substantially perpendicular to the medium contacting surface and wherein the transducer is affixed to the support surface such that the transducing element of the transducer is located adjacent the medium contacting surface and with the leads of the transducer extending along the supporting surface away from the medium contacting surface; bonding a spacer to the substrate and transducer wherein the spacer is formed of a material which is highly resistant to being abraded by a recording medium and has a medium contacting surface of a preselected width and sidewalls extending substantially perpendicular therefrom and the spacer is positioned adjacent the substrate supporting surface with one of the spacer sidewalls contiguous the transducer which is located therebetween and the spacer medium contacting surface is positioned adjacent the transducing element; bonding an electrical circuit means to the substrate and transducer wherein the electrical circuit means terminates in an edge having a width which does not exceed said preselected width and wherein the electrical circuit means has spaced, opposed outer surfaces extending from the edge with one of the outer surfaces having exposed conductors and the electrical circuit means is positioned with the edge thereof adjacent the transducer and with the outer surfaces thereof having the exposed conductors positioned adjacent the substrate supporting surface and in electrical contact with said leads of the transducer; and applying a clamping force to the transducing sub-assembly during the bonding steps.

The known prior art methods for manufacturing a magnetic head assembly having an inductive transducer as the write element and a magnetoresistive transducer as the read element utilizes a sandwich constructed center section which include pairs of glass filled slots as a means for providing a shield between the inductive elements. The half yoke end pieces having the transducer elements mounted thereon are assembled and held together by means of a vise-type clamping force applied thereto by bolts, with the center shield therebetween. The medium contacting surface of the so formed magnetic head assembly comprises the ferrite or titanium end blocks, ferrite spacers and the center section having the glass filled slots.

Each of the sub-assemblies, together with the sandwich center section, are then formed into an assembly having a low viscosity epoxy applied thereto and are held together by fasteners. This known manufacturing process, and the product produced thereby, is a multistep process requiring a specially fabricated center section having glass slots which function to define the write tracks. Also, the materials which contact the recording medium have a wear characteristic which is similiar to the state-of-the-art magnetic tape head assemblies.

The known method of fabricating magnetic head assemblies using the glass bonding techniques are utilized in fabricating magnetic disc head assemblies. This process requires exposing the sensors to temperatures which would melt the glass to provide the glass bonding and the control required to maintain the temperature levels within ranges which do not affect the magnetic characteristics of the sensor and may not be suitable for high yield fabrication of magnetic tape assemblies.

The present invention overcomes the disadvantages of the known prior art methods by providing a method for forming transducing sub-assemblies by bonding and then assembling the transducing sub-assemblies with a feed-through shield, into a magnetic tape head assembly utilizing adhesive, e.g., epoxy, bonding under a clamping pressure.

Another advantage of the magnetic head assembly produced by the process of the method of the present invention is that a full feed-through shield is incorporated into the magnetic tape head assembly to insure that the magnetoresistive thin film transducer is shielded from the inductive thin film transducer during the read-while-write operations.

Still another advantage of the present invention is that the tooling required to produce the transducing sub-assemblies and the magnetic tape head assembly is minimized as well as the number of elements and the apparatus required to assemble the same.

A still yet another advantage of the present invention is that the feed-through shield is formed of a material which wears faster than the high wear characteristics substrate and spacers resulting in a magnetic tape head assembly having a medium contacting surface having differential wear characteristics thereby insuring that the substrate and spacers which support the transducers, have intimate head-to-tape contact.

A still yet further advantage of the present invention is that substrate and spacer are formed of a highly resistant material which results in an improved head wear characteristic without degrading tape life.

A still yet further advantage of the present invention is that higher tape speeds and higher recording densities are possible using the magnetic tape head assembly produced by using the process and method disclosed herein.

BRIEF DESCRIPTION OF THE DRAWING

The foregoing and other advantages and features of this invention will become apparent from the following description of the preferred embodiment, when considered together with the illustrations and accompanying drawing which includes the following Figures.

DESCRIPTION OF THE PREFERRED EMBODIMENT

Figure 1:
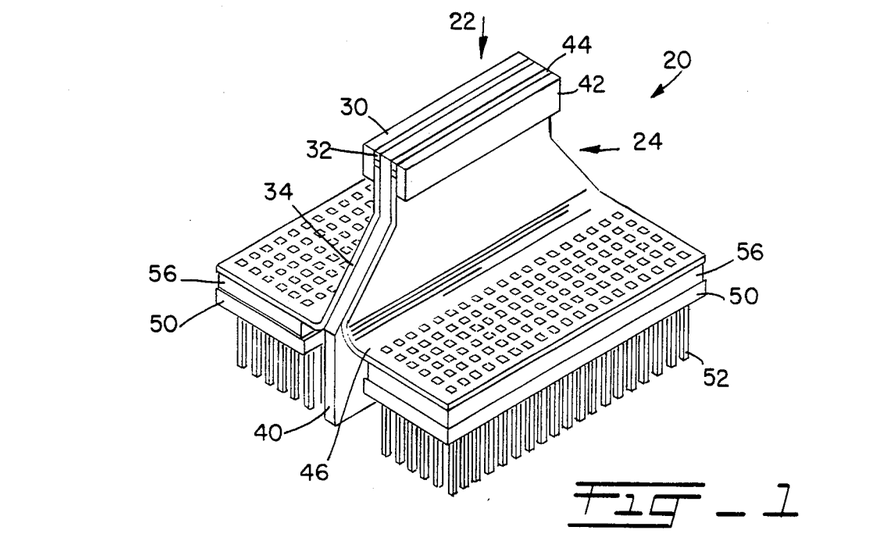
FIG. 1 is a perspective view of a magnetic tape head assembly produced by the method of the present invention.
Figures 7, 8, 9:
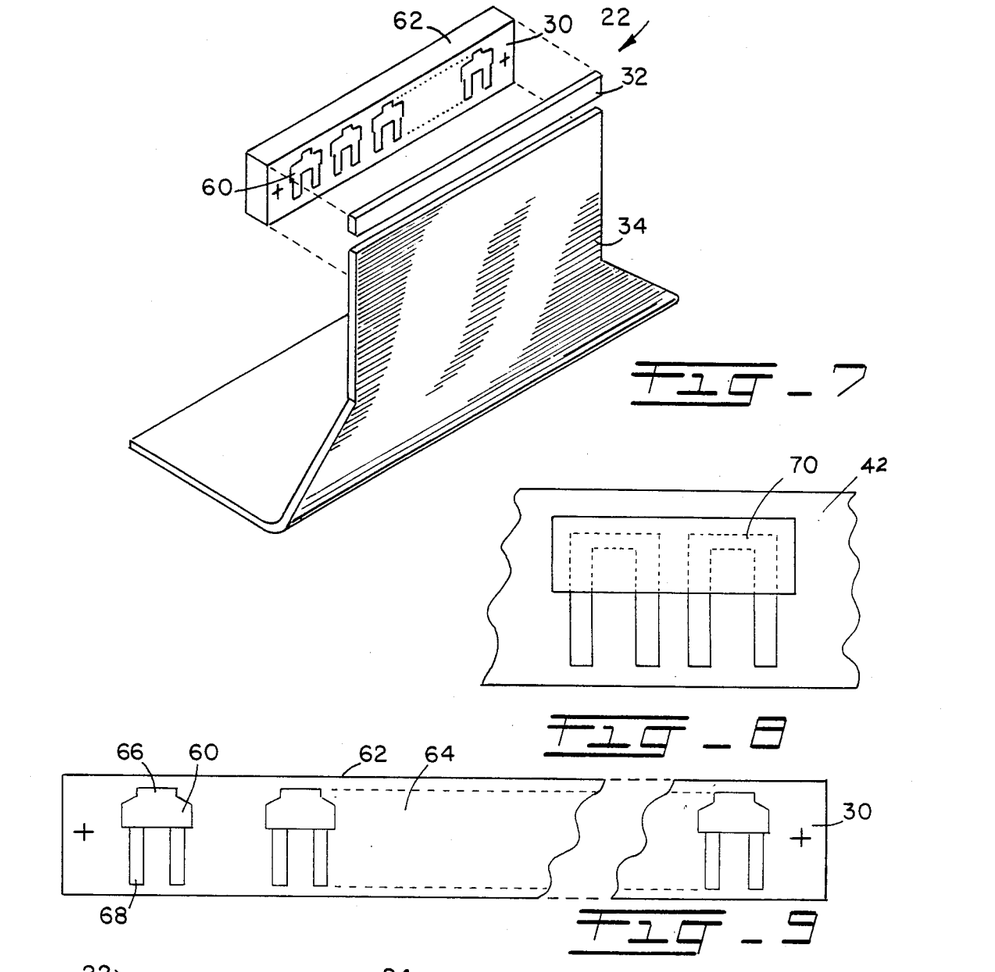
FIG. 7 is an exploded perspective view of a write transducing sub-assembly utilizing inductive thin film transucers formed using the teaching of this invention.
FIG. 8 is a pictoral representation of the substrate having magnetoresistive thin film transducers.
FIG. 9 is a front plan view of a substrate having a plurality of inductive thin film transducers mounted thereon.

In FIG. 1 a multi-track read-while-write magnetic tape head assembly, shown generally as 20, adapted for use with a recording medium has a write transducing sub-assembly 22 comprising a first substrate 30, first spacer 32 and an electrical circuit means 34. The first substrate 30 is formed of a material which is highly resistant to being abraded by a medium being transported thereacross. The first substrate 30 has a medium contacting surface and a supporting surface which is substantially perpendicular to the medium contacting surface. The first substrate 30 supports a transducer having a transducing element located on one side and leads located on a different side. The transducing element is located adjacent the medium contacting surface and with the leads extending along the supporting surface away from the medium contacting surface. The construction of a substrate with inductive thin film transducers is shown in detail in FIG. 9 and the construction of a substrate with magnetoresistive thin film transducers is shown in FIG. 8.

A first spacer 32 is formed of a material which is highly resistant to being abraded by a medium and having a medium contacting surface of a preselected width and spaced sidewalls extending substantially perpendicular therefrom a distance covering the transducing element. The first spacer 32 is positioned such that one of the sidewalls is adjacent the substrate supporting surface and contiguous the transducer with the transducing element located therebetween.

An electrical circuit means 34 terminates in an edge having a width which does not exceed the preselected width of the first spacer 32. The electrical circuit means 34 has spaced, opposed outer surfaces which extend substantially perpendicular from the edge and one of the sidewalls thereof has exposed conductors. The sidewall of the electrical circuit means 34 is positioned to the supporting surface of the first substrate 30 wherein the exposed conductors make intimate electrical contact with said leads of the transducer. The electrical circuit means 34 has its edge in an opposed spaced alignment from the first spacer 32 and from the transducing element.

A read transducing sub-assembly 24 includes a second substrate 42 having a transducer which, in the preferred embodiment, is a magnetoresistive thin film transducer, mounted thereon. The second substrate 42 is formed of the same material as the first substrate 30. The read transducing sub-assembly 24 further includes a second spacer 44 and a second electrical circuit means 46. The construction of these elements are the same as those of the write transducing sub-assembly 22. The electrical circuit means illustrated in FIG. 1 is included in the description of FIGS. 2 to 4, inclusive.

Figure 2:
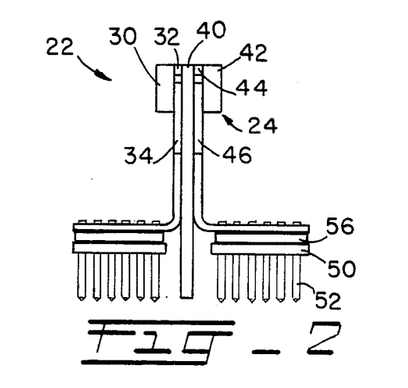
FIG. 2 is a left side plan view of the magnetic tape head assembly of FIG. 1.
Figure 3:
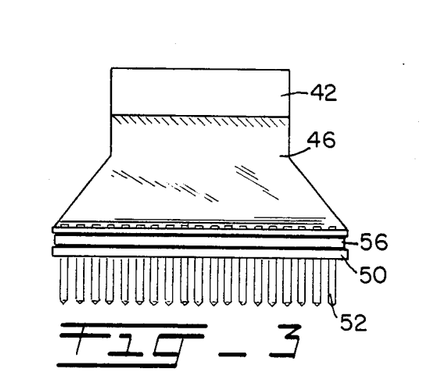
FIG. 3 is a front view of the magnetic tape head assembly of FIG. 1.
Figure 4:
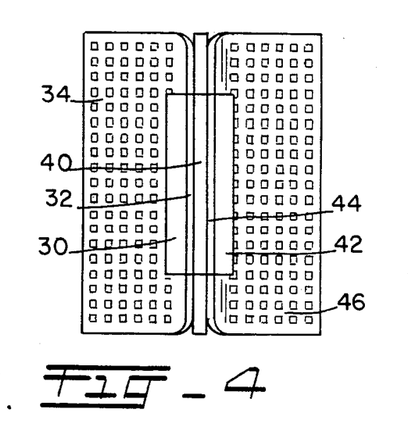
FIG. 4 is a top plan view of the magnetic tape head assembly of FIG. 1.
Figure 5:
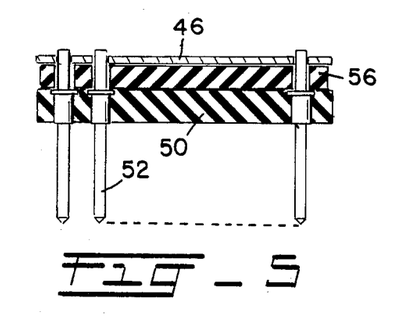
FIG. 5 is a exploded partial plan view of the flexible electrical conductors affixed to the pins of the electrical connector.

FIGS. 2, 3 and 4 show the assembled multi-track read-while-write magnetic tape head assembly 20. As illustrated in FIG. 2, the multi-track read-while-write magnetic head tape assembly 20 includes the write transducing sub-assembly 22 and the read transducing sub-assembly 24. FIGS. 1 to 4, inclusive, show that the first electrical circuit means 34 and the second electrical circuit means 46 are each adapted to be electrically connected to electrical connector pins 52 which are supported and held in position by electrical pin supporting web 50. An electrical connector spacer 56 is located between the electrical circuit means 34 and the second electrical circuit means 46 of each transducing sub-assembly and the electrical pin supporting web 50.

In the preferred embodiment, the write transducing sub-assembly 22 and read transducing sub-assembly 24 may comprise a plurality of thin film transducers to form a nine track magnetic tape head assembly. However, it is envisioned that the transducing sub-assemblies may comprise any number of transducers which may be in multiples of nine such as for example, eighteen thin film transducers to form an eighteen track, read-while-write magnetic tape head assembly. In a typical nine track magnetic tape head assembly, the write track width is typically in the order of 44 mils and the read track width is typically in the order of 40 mils with a center spacing of about 55 mils.

In one embodiment of the multi-track read-while-write magnetic head tape assembly 20 shown in FIGS. 1 to 5, inclusive, tape speeds in the order of 100 inches per second (ips) were utilized with tape tension in the order of 8 ounces and with a tape wrap angle of about 9.5° or about 4.5° on each side. The magnetic tape had a width of about $\frac{1}{2}$ inch, was a 3M Brand type 777 tape. The first substrate 30, the second substrate 42, the first spacer 32 and the second spacer 44 were formed of a mixture of Aluminum Oxide and Titanium Carbide ($Al_2O_3$—TiC).

One mixture of Aluminum Oxide and Titanium Carbide which may be used is a high density, fine grained, $Al_2O_3$—TiC composite compound offered for sale by the Technical Ceramic Products Division of 3M Company of St. Paul, Minn. under the Trademark "AlSiMag204". In this embodiment, the magnetic tape head had a life in excess of 200 months.

Figure 6:
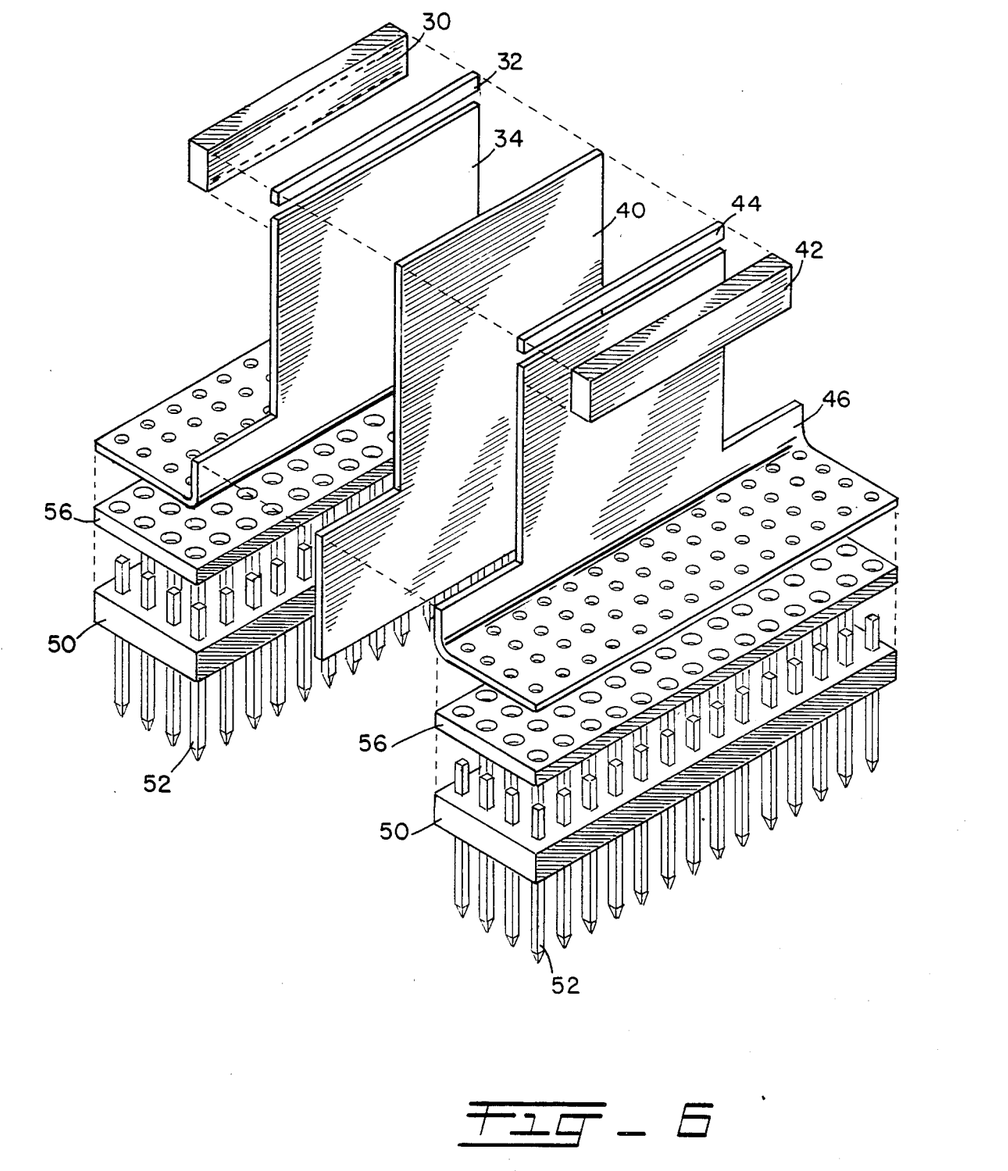
FIG. 6 is an exploded perspective view of two transducing sub-assemblies and feed-through shield which is assembled using the method of the present invention.

FIG. 6 shows the details of the construction of the preferred embodiment of the product, a multi-track read-while-write magnetic tape head assembly 20, produced by the process of this invention. In the preferred embodiment, the write transducing sub-assembly 22 includes the first substrate 30 which has eighteen inductive thin film transducers deposited thereon using known state-of-the-art techniques. The first spacer 32 and the second spacer 44 are selected to be formed of a material which is highly resistant to being abraded by a medium being placed in contact therewith and transported thereacross. The width of the first spacer 32 and the second spacer 44 are predetermined and may be in the order of 5 mils. The electrical circuit means 34 and the second electrical circuit means 46 are likewise selected to have a predetermined width which is substantially the same as that of the first spacer 32 and second spacer 44, respectively. In one embodiment of the multi-track read-while-write magnetic head tape assembly 20, the spacing between the lower edges of the first spacer 32 and the second spacer 44 and its respective electrical circuit means 34 and second electrical circuit means 46 were in the order of about 5 mils.

In the preferred embodiment, the electrical circuit means 34 and second electrical circuit means 46 were flexible electrical circuits having a web formed of insulating material and electrical conductors which are well known in the state of the art. The flexible electric circuit includes electrical terminals having a cross-sectional area which is precisely positioned on the flexible electrical circuit web at the end thereof. The electrical terminals are capable of being pierced by the electrical connector pins 52. The electrical connector pins 52 are electrically connected to the electrical terminals by soldering.

Referring to FIG. 6, the feed-through shield 40 is formed of a magnetic material having high permeability and good wear characteristics. The feed-through shield 40 will wear at a higher rate than the first substrate 30, the second substrate 42, the first spacer 32 and the second spacer 44 resulting in a differential wearing surface. The feed-through shield 40 essentially shields the magnetoresistive thin film transducers affixed to the second substrate 42 from feed-through effects of the inductive thin film transducers affixed to first substrate 30.

FIG. 8 illustrates that substrate 42 has the magnetoresistive thin film transducers, of which transducer 70 is typical, deposited thereon.

Of course any known magnetoresistive thin film transducer or inductive thin film transducer may be used in producing this invention and may be located on either the first substrate 30 or the second substrate 42, as the case may be.

FIG. 9 shows the details of the first substrate 30 including its medium contacting surface 62 and its supporting surface 64 which is substantially perpendicular to the medium contacting surface 62. In FIG. 9, a plurality of spaced, planar inductive thin film transducers 60 are mounted with their respective transducing gaps 66 one side thereof adjacent the medium contacting surface 62 and the respective leads 68 extending from the other side thereof and located on the supporting surface 64 and away from the medium contacting surface 62.

Figure 10:
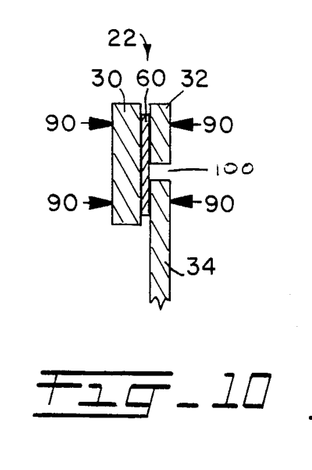
FIGS. 10, 11 and 12 illustrate by cross-sectional views the various steps of the method of the present invention.
Figure 11:
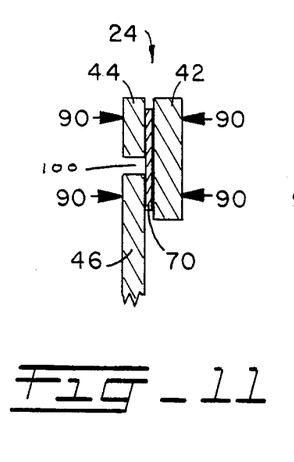
Figure 12:
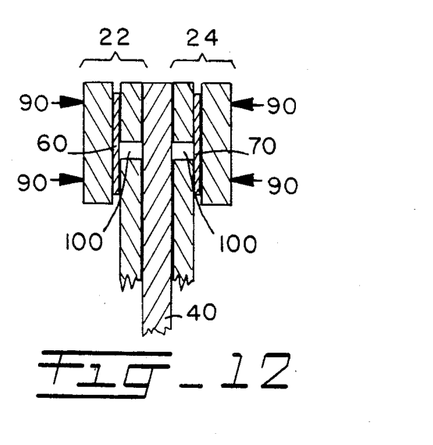

FIGS. 10, 11 and 12 illustrate the steps of the method of forming the multi-track read-while-write magnetic tape head assembly 20. In the preferred embodiment, the write transducing sub-assembly 22 is formed in one sub-process and the read transducing sub-assembly 24 is formed by a second sub-process. Thereupon the write transducing sub-assembly 22 and the read transducing sub-assembly 24 are assembled with the feed-through shield 40 therebetween to form the multi-track read-while-write magnetic tape head assembly 20. The first electrical circuit means 34 and the second electrical circuit means 46 are then connected to the electrical connector pins 52 supported by electrical pin supporting web 50.

In the preferred embodiment, a method of manufacturing either of the transducing head sub-assemblies for a multi-track read-while-write magnetic head assembly adapted for use with a recording medium comprises the steps of: p (1) affixing a substrate, formed of a material which is highly resistant to being abraded by a medium being transported thereacross and having a medium contacting surface and a supporting surface which is substantially perpendicular to the medium contacting surface, to a transducer having a transducing element located on one side and leads located on a different side with the transducing element located adjacent the medium contacting surface and with the leads extending along the supporting surface away from the medium contacting surface;

(2) bonding a spacer, formed of a material which is highly resistant to being abraded by a medium and having a medium contacting surface of a preselected width having spaced sidewalls extending substantially perpendicular therefrom, with one of the sidewalls adjacent the the substrate supporting surface and contiguous the transducer with the transducing element located therebetween;

(3) bonding and heating an electrical circuit means, which terminates in an edge having a width which does not exceed the preselected width, with spaced, opposed outer surfaces which extend substantially perpendicular from the edge with one of the sidewalls having exposed conductors, to the supporting surface of the substrate wherein solder coated conductors are heated to a temperature wherein the electrical conductors are soldered to the leads of the transducer, the electrical circuit means having its edge spaced from the first spacer and from the transducer; and (4) applying a clamping force to the transducing sub-assembly during the bonding steps.

The above method can include the steps of bonding a first transducing sub-assembly and a second transducing sub-assembly produced with the above process to a feed-through shield 40 and then bonding the feed-through shield 40 with the above applying of a clamping force to form the multi-track read-while-write magnetic head tape assembly 20.

For the step of heating in step 3, it is desirable in the preferred embodiment to cause the solder coated conductors to be soldered to the leads of the transducer. If only exposed conductors are used, which is an alternative, the step of heating is used to lure the expoxy while the exposed conductors make intimate contact with the leads of the transducer. The temperature for heating and soldering would be in the order of about 230° C. to 240° C. to flow the solder. The temperature to cure the epoxy depends on the epoxy and would typically be at a lower temperature than that required for soldering.

The heating step of the process utilizes temperatures in the order of 230° C. to 240° C. for the solder flow. The transducing sub-assembly is held at the solder flow temperature for the time required to flow the solder. In certain applications, it may be necessary to apply a magnetic field for preserving the magnetic properties of the magnetic film within the transducer.

After the multi-track read-while-write magnetic tape head assembly 20 is fabricated using the above process, the step of forming a contour on the magnetic head assembly by lapping and polishing the medium contacting surface of the so formed multi-track read-while-write magnetic tape head assembly 20 into the desired shape is performed.

The step of attaching electrical connection pins to the electrical conducting means and the soldering of the electrical connection pins to the electrical conducting means can be preformed after the magnetic head assembly is completed.

As illustrated in FIG. 10, a transducing sub-assembly is formed of the first substrate 30, the inductive thin film transducers 60, the first spacer 32 and electrical circuit means 34. The first substrate 30 has the inductive thin film transducers 60 affixed thereto by deposition using known deposition processes. The first substrate 30 with the inductive thin film transducers 60 is bonded to the first spacer 32 and to the solder coated electrical conductors of the electrical circuit means 34 as shonw in FIG. 10. A low viscosity epoxy, cement or other appropriate adhesive is applied to the components of the sub-assembly while the entire sub-assembly is clamped under pressure as shown by arrows 90 depicting a clamping force. Preferably, the entire sub-assemlby is then heated to the required temperature to cause the solder to flow. The low viscosity epoxy (or appropriate adhesive) is drawn into the voids and spaces therebetween and sets to provide the bonding action. The solder on the solder coated electrical conductors of the circuit means will flow and bond to the leads of the transducer. The first substrate 30 is positioned with its medium contacting surface 62 adjacent the medium contacting surface of the first spacer 32. The inductive thin film transducers 60 are positioned in the transducing sub-assembly with the transducing element 66 located between the supporting surface 64 and the first spacer 32. The edge of the electrical circuit means 34 is spaced from the edge of the first spacer 32 as shown in FIG. 10 by opening 100.

FIG. 11 shows the read transducing sub-assembly 24 which is formed of the second substrate 42, the magnetoresistive thin film transducers 70, the second spacer 44 and the second electrical circuit means 46. The read transducing sub-assembly 24 is assembled using the above described process and is held in place during the epoxy curing process by a clamping force shown by arrows 90.

FIG. 12 shows the step of bonding the write transducing sub-assembly 22, the feed-through shield 40 and the read transducing sub-assembly 24 into a multi-track read-while-write magnetic head assembly 20. A low viscosity epoxy is used as the bonding agent and the entire assembly is subject to a clamping force shown by arrows 90.

In the preferred embodiment, a multi-track read-while-write magnetic tape head assembly 20 adapted for use with magnetic tape media, can be fabricated by using the process described herein. In its broadest concept, the electrical current means may include electrical conductors extending from the electrical connection pins to an external electrical circuit.

What is claimed is:

1. A method of manufacturing a transducing subassembly for a magnetic head assembly adapted for use with a recording medium comprising the steps of affixing a transducer onto a substrate wherein the transducer includes a transducing element located on one side thereof and leads located on a different side thereof and wherein the substrate is formed of a material which is highly resistant to being abraded by a recording medium being transported thereacross and the substrate has a medium contacting surface and a supporting surface which is substantially perpendicular to the medium contacting surface and wherein the transducer is affixed to the support surface such that the transducing element of the transducer is located adjacent the medium contacting surface and with the leads of the transducer extending along the supporting surface away from the medium contacting surface;

bonding a spacer to the substrate and transducer wherein the spacer is formed of a material which is highly resistant to being abraded by a recording medium and has a medium contacting surface of a preselected width and sidewalls extending substantially perpendicular therefrom a distance equal to the length of the transducing element and the spacer is positioned adjacent the substrate supporting surface with one of the spacer sidewalls contiguous the transducer which is located therebetween and the spacer medium contacting surface is positioned adjacent the transducing element;

bonding an electrical circuit means to the substrate and transducer wherein the electrical circuit means terminates in an edge having a width which does not exceed said preselected width and wherein the electrical circuit means has spaced, opposed outer surfaces extending from the edge with one of the outer surfaces having exposed conductors and the electrical circuit means is positioned with the edge thereof adjacent the transducer in opposed, spaced alignment from said spacer and with the outer surfaces thereof having the exposed conductors positioned adjacent the substrate supporting surface and in electrical contact with said leads of the transducer; and applying a clamping force to the transducing subassembly during the bonding steps.

2. The method of claim 1 wherein the exposed conductors of the electrical circuit means are solder coated, and wherein the step of bonding the electrical circuit means includes the step of heating the transducing subassembly to a temperature wherein the exposed conductors are soldered to the leads of the transducer.

3. The method of claim 1 wherein said step of affixing the transducer to the substrate includes the step of depositing a thin film transducer onto a substrate with the transducing element thereof adjacent the medium contacting surface.

4. The method of claim 1 wherein said steps of bonding the spacer and bonding the electrical current means to the leads of the transducer utilizes a low viscosity epoxy.

5. The method of claim 1 further comprising the steps of attaching electrical connection pins to said electrical circuit means; and soldering the electrical connection pins to said electrical circuit means.

6. A method of manufacturing a transducing subassembly for a read-while-write magnetic head assembly adapted for use with a recording medium comprising the steps of forming a first transducing subassembly and a second transducing subassembly by the steps of depositing at least one transducer onto a substrate wherein the transducer includes a transducing element located on one side thereof and leads located on a different side thereof and wherein the substrate is formed of a material which is highly resistant to being abraded by a medium being transported thereacross and the substrate has a medium contacting surface and a supporting surface which is substantially perpendicular to the medium contacting surface, and wherein said at least one transducer is affixed to the support surface such that its transducing element is located adjacent the medium contacting surface and with the leads of the transducer extending along the supporting surface away from the medium contacting surface;

bonding a spacer to the substrate and transducer wherein the spacer is formed of a material which is highly resistant to being abraded by a medium and has a medium contacting surface of a preselected width and sidewalls extending substantially perpendicular therefrom a distance equal to the length of the transducing element and the spacer is positioned adjacent the substrate supporting surface with one of the sidewalls contiguous said at least one transducer which is located therebetween and the spacer medium contacting surfce is positioned adjacent the transducing element;

bonding an electrical cirucit means which terminates in an edge having a width which does not exceed said preselected width and wherein the electrical circuit means has spaced, opposed outer surfaces extending from its edge with one of the outer surfaces having exposed conductors, and the electrical circuit means is positioned with the edge thereof adjacent the transducer in an opposed, spaced alignment from said spacer and with the outer surfaces thereof having the exposed conductors positioned adjacent the substrate supporting surface and in electrical contact with the leads of said transducer;

applying a clamping force to each of the first and second transducing subassemblies during the bonding steps;

applying a bonding adhesive to each of the first transducing subassembly and the second transducing subassembly and to a feed-through shield;

assembling the transducing subassemblies into a magnetic head assembly having the feed-through shield interposed between the first transducing subassembly and the second transducing subassembly; and applying a clamping force to the magnetic head assembly until the bonding adhesive is cured.

7. The method of claim 6 further comprising the step of
forming a contour on the magentic head assembly by lapping and polishing the entire medium contacting surface of the magnetic head assembly .

8. The method of claim 6 wherein said step of affixing a plurality of spaced planar transducers to said substrate includes the step of
depositing a plurality of magnetoresistive thin film transducers onto a first substrate supporting surface and a plurality of inductive thin film transducers onto a second substrate supporting surface.

9. The method of claim 7 comprising the steps of
attaching electrical connection pins to said electrical circuit means; and
soldering the electrical connection pins to said electrical circuit means.

10. The method of claim 9 wherein said substrates and said spacers are formed of a mixture of aluminum oxide and titanium carbide.

11. The method of claim 10 wherein the feed-through shield includes a magnetic material having a relatively high permeability.

12. A method of manufacturing a multi-track read-while-write magentic head assembly adapted for use with a recording medium comprising the steps of
depositing a plurality of spaced, planar transducers onto a first substrate wherein each of the transducers includes a transducing element located on one side thereof and leads located on a different side thereof and wherein said first substrate is formed of a material which is highly resistant to being abraded by a recording medium being transported thereacross and the first substrate has a medium contacting surface and a supporting surface which is substantially perpendicular to the medium contacting surface and wherein each of said plurality of spaced, planar transducers is affixed to the first substrate supporting surface such that the transducing element thereof is located adjacent the first substrate medium contacting surface and with the leads of each of the transducers extending along the first substrate supporting surface away from the medium contacting surface;

bonding a first spacer to the substrate and transducer wherein the spacer is formed of a material which is highly resistant to being abraded by a medium and has a first spacer medium contacting surface of a preselected width and sidewalls extending substantially perpendicular therefrom a distance equal to the length of the transducing element, and the first spacer is positioned adjacent the first substrate supporting surface with one of the first spacer sidewalls contiguous each of said transducers which are located therebetween and the first spacer medium contacting surface is positioned adjacent each of the transducing elements;

bonding a first electrical circuit means to the first substrate and each of the transducers located thereon wherein the first electrical circuit means terminates in an edge having a width which does not exceed said preselected width and wherein the first electrical circuit means has spaced, opposed outer surfaces extending from the edge with one of the outer surfaces having exposed conductors and the first electrical circuit means is positioned with the edge thereof adjacent each of the transducers in an opposed, spaced alignment from said spacer and with the outer surfaces having the exposed conductors positioned adjacent the first substrate supporting surface in electrical contract with the leads of the transducers;

applying a clamping force to the first substrate, first spacer and first electrical circuit means during the bonding step to form a first transducing subassembly;

depositing a plurality of spaced, planar transducers onto a second substrate wherein each of the transducers includes a transducing element located on one side thereof and leads located on a different side thereof, and herein said second substrate is formed of a material which is highly resistant to being abraded by a recording medium being transported thereacross and the second substrate has a medium contacting surface and a supporting surface which is substantially perpendicular to the medium contacting surface and wherein each of said plurality of spaced, planar transducers is affixed to the first substrate supporting surface such that the transducing element thereof is located adjacent the second substrate medium contacting surface and with the leads of each of the transducers extending along the first substrate supporting surface away from the medium contacting surface;

bonding a second spacer to the substrate and transducer wherein the spacer is formed of a material which is highly resistant to being abraded by a medium and has a first spacer medium contacting surface of a preselected width and sidewalls extending substantially perpendicular therefrom a distance equal to the length of the transducing element, and the second spacer is positioned adjacent the second substrate supporting surface with one of the first spacer sidewalls contiguous each of said transducers which are located therebetween and the second spacer medium contacting surface is positioned adjacent each of the transducing elements;

bonding a second electrical circuit means to the second substrate and each of the transducers located thereon wherein the second electrical circuit means terminates in an edge having a width which does not exceed said preselected width and wherein the second electrical circuit means has spaced opposed outer surfaces extending from the edge with one of the outer surfaces having exposed conductors and the second electrical circuit means is positioned with the edge thereof adjacent each of the transducers in an opposed, spaced alignment from said spacer and with the outer surfaces having the exposed conductors positioned adjacent the second substrate supporting surface in electrical contact with the leads of the transducers;

applying a clamping force to the second substrate, second spacer and second electrical circuit means during the bonding step to form a second transducing subassembly;

bonding a feed-through shield between the first transducing subassembly and second transducing subassembly; and applying a clamping force to the magnetic head assembly during the bonding of the feed-through shield between the first transducing subassembly and the second transducing subassembly.

13. The method of claim 12 further comprising the steps of forming a contour on the magnetic head assembly by abrading the entire medium contacting surface of the magnetic head assembly.

14. The method of claim 13 further comprising the step of attaching electrical connection pins to said electrical circuit means; and soldering the electrical connection pins to said electrical circuit means.

15. The process for forming a device for transducing electrical signals and magnetic fields comprising the steps of depositing at least one transducer onto a substrate wherein the transducer includes a transducing element located on one side thereof and leads located on a different side thereof and wherein the substrate is formed of a material which is highly resistant to being abraded by a medium being transported thereacross and the substrate has a medium contacting surface and a supporting surface which is substantially perpendicular to the medium contacting surface, and wherein said at least one transducer is affixed to the support surface such that its transducing element is located adjacent the medium contacting surface and with the leads of the transducer extending along the supporting surface away from the medium contacting surface;

bonding a spacer to the substrate and transducer wherein the spacer is formed of a material which is highly resistant to being abraded by a medium and has a medium contacting surface of a preselected width and sidewalls extending substantially perpendicular therefrom a distance equal to the length of the transducing element and the spacer is positioned adjacent the substrate supporting surface with one of the sidewalls contiguous said at least one transducer which is located therebetween and the spacer medium contacting surface is positioned adjacent the transducing element;

bonding an electrical circuit means which terminates in an edge having a width which does not exceed said preselected width and wherein the electrical circuit means has spaced, opposed outer surfaces extending from its edge with one of the outer surfaces having exposed conductors, and the electrical circuit means is positioned with the edge thereof adjacent the transducer in an opposed, spaced alignment from said spacer and with the outer surfaces thereof having the exposed conductors positioned adjacent the substrate supporting surface and in electrical contact with the leads of said transducer;

applying a clamping force to each of the first and second transducing subassemblies during the bonding steps;

applying a bonding adhesive to each of the first transducing subassembly and the second transducing subassembly and to a feed-through shield;

assembling the transducing subassemblies into a magnetic head assembly having the feed-through shield interposed between the first transducing subassembly and the second transducing subassembly;

applying a clamping force to the magnetic head assembly until the bonding adhesive is cured;

applying a clamping force to the transducing subassembly during the bonding steps; and electrically connecting conductors from an external electrical circuit to said electrical circuit means.

16. The product made by the process of forming a first transducer subassembly and a second transducer subassembly by the steps of depositing at least one transducer onto a substrate wherein the transducer includes a transducing element located on one side thereof and leads located on a different side thereof and wherein the substrate is formed of a material which is highly resistant to being abraded by a medium being transported thereacross and the substrate has a medium contacting surface and a supporting surface which is substantially perpendicular to the medium contacting surface, and wherein said at least one transducer is affixed to the support surface such that its transducing element is located adjacent the medium contacting surface and with the leads of the transducer extending along the supporting surface away from the medium contacting surface;

bonding a spacer to the substrate and transducer wherein the spacer is formed of a material which is highly resistant to being abraded by a medium and has a medium contacting surface of a preselected width and sidewalls extending substantially perpendicular therefrom a distance equal to the length of the transducing element and the spacer is positioned adjacent the substrate supporting surface with one of the sidewalls contiguous said at least one transducer which is located therebetween and the spacer medium contacting surface is positioned adjacent the transducing element;

bonding an electrical circuit means which terminates in an edge having a width which does not exceed said preselected width and wherein the electrical circuit means has spaced, opposed outer surfaces extending from its edge with one of the outer surfaces having exposed conductors, and the electrical circuit means is positioned with the edge thereof adjacent the transducer in an opposed, spaced alignment from said spacer and with the outer surfaces thereof having the exposed conductors positioned adjacent the substrate supporting surface and in electrical contact with the leads of said transducer;

applying a clamping force to each of the first and second transducing subassemblies during the bonding steps;

applying a bonding adhesive to each of the first transducing subassembly and the second transducing subassembly and to a feed-through shield;

assembling the transducing subassemblies into a magnetic head assembly having the feed-through shield interposed between the first transducing subassembly and the second transducing subassembly; and applying a clamping force to the magnetic head assembly until the bonding adhesive is cured.

17. The product made by the process of claim 16 further comprising the step of forming a contour on the magnetic head assembly by abrading the entire medium contacting surface of the magnetic head assembly.

18. The product made by the process of claim 16 wherein said step of affixing a plurality of spaced planar transducers to said substrate includes the step of depositing a plurality of inductive thin film transducer onto a first substrate and a plurality of magnetoresistive thin film transducers onto a second substrate.

19. The product made by the process of affixing a transducer onto a substrate wherein the transducer includes a transducing element located on one side thereof and leads located on a different side thereof and wherein the substrate is formed of a material which is highly resistant to being abraded by a recording medium being transported thereacross and the substrate has a medium contacting surface and a supporting surface which is substantially perpendicular to the medium contacting surface and wherein the transducer is affixed to the support surface such that the transducing element of the transducer is located adjacent the medium contacting surface and with the leads of the transducer extending along the supporting surface away from the medium contacting surface;

bonding a spacer to the substrate and transducer wherein the spacer is formed of a material which is highly resistant to being abraded by a recording medium and has a medium contacting surface of a preselected width and sidewalls extending substantially perpendicular therefrom a distance equal to the length of the transducing element and the spacer is positioned adjacent the substrate supporting surface with one of the spacer sidewalls contiguous the transducer which is located therebetween and the spacer medium contacting surface is positioned adjacent the transducing element;

bonding an electrical circuit means to the substrate and transducer wherein the electrical circuit means terminates in an edge having a width which does not exceed said preselected width and wherein the electrical circuit means has spaced, opposed outer surfaces extending from the edge with one of the outer surfaces having exposed conductors and the electrical circuit means is positioned with the edge thereof adjacent the transducer in an opposed, spaced alignment from said spacer and with the outer surfaces thereof having the exposed conductors positioned adjacent the substrate supporting surface and in electrical contact with the leads of said transducer; and applying a clamping force to the transducing subassemblies during the bonding steps.

20. The product made by the process of claim 19 wherein the electrical circuit means has solder coated conductors and wherein the step of bonding the electrical circuit means includes the step of heating the electrical circuit means to a temperature wherein the electrical conductors are soldered to the leads of the transducer.

21. A method of manufacturing a transducing subassembly for a magnetic head assembly adapted for use with a recording medium comprising the steps of affixing a transducer onto a substrate wherein the transducer includes a transducing element located on one side thereof and leads located on a different side thereof and wherein the substrate is formed of a material which is highly resistant to being abraded by a recording medium being transported thereacross and the substrate has a medium contacting surface and a supporting surface which is substantially perpendicular to the medium contacting surface and wherein the transducer is affixed to the support surface such that the transducing element of the transducer is located adjacent the medium contacting surface and with the leads of the transducer extending along the supporting surface away from the medium contacting surface;

bonding with a curable epoxy bonding material a spacer to the substrate and transducer wherein the spacer is formed of a material which is highly resistant to being abraded by a recording medium and has a medium contacting surface of a preselected width and sidewalls extending substantially perpendicular therefrom a distance equal to the length of the transducing element and the spacer is positioned adjacent the substrate supporting surface with one of the spacer sidewalls contiguous the transducer which is located therebetween and the spacer medium contacting surface is positioned adjacent the transducing element, said curable epoxy bonding material being selected of a material which is electrically and magnetically compatible with the thin film magnetic transducer and which has a curing temperature below a thermal stress temperature at which at least one of the electrical characteristics and the magnetic characteristics of the thin film magnetic transducer are permanently distorted;

bonding with said curable bonding material on electrical circuit means to the substrate and transducer wherein the electrical circuit means terminates in an edge having a width which does not exceed said preselected width and wherein the electrical circuit means has spaced, opposed outer surfaces extending from the edge with one of the outer surfaces having exposed conductors which include a relatively thin, diffusible conductive metal coating located thereon and the electrical circuit means is positioned with the edge thereof adjacent the transducer in an opposed, spaced alignment from said space and with the outer surfaces thereof having the exposed conductors thin, diffusible conductive metal coating located thereon positioned adjacent the substrate supporting surface and in electrical contact with the leads of said transducer; and applying a clamping force to the transducing subassemblies during the bonding steps.

22. The method of claim 21 wherein the exposed conductors of the electrical circuit means are solder coated, and wherein the step of bonding the electrical circuit means includes the step of controllably heating the subassembly at a heating rate which permits the thermal stresses of the subassembly to be maintained at a level to avoid damage to the subassembly during heating thereof up to a temperature located in a bonding temperature range between the curing temperature of the curable epoxy bonding material and below the thermal stress temperature.

23. The method of claim 22 further comprising the steps of attaching electrical connection pins to said electrical circuit means; and soldering the electrical connection pins to said electrical circuit means.

* * * * *